Patented Oct. 14, 1924.

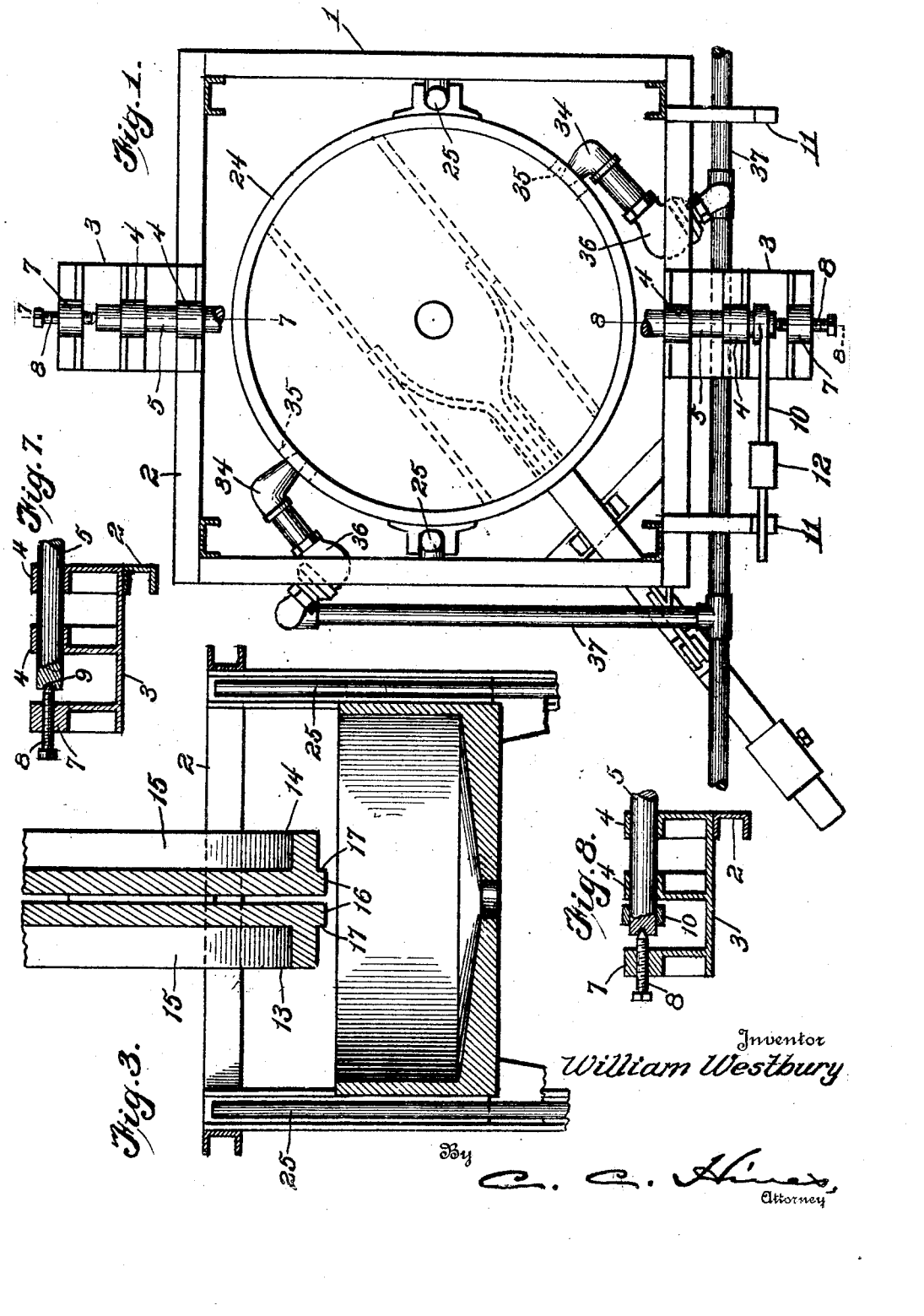

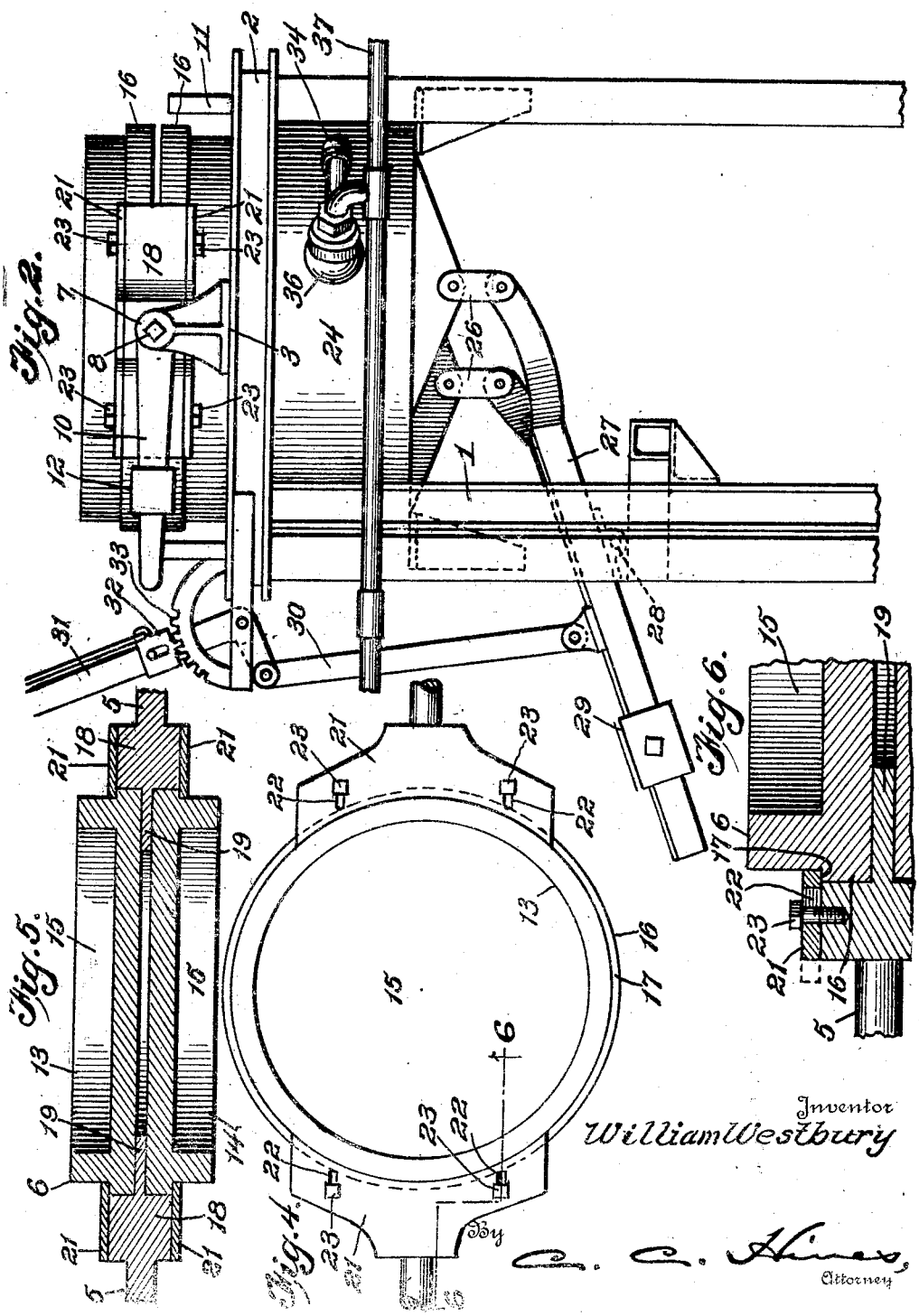

1,511,551

UNITED STATES PATENT OFFICE.

WILLIAM WESTBURY, OF INDEPENDENCE, KANSAS, ASSIGNOR TO LAURA ANNA WESTBURY, OF INDEPENDENCE, KANSAS.

REVERSIBLE POT.

Application filed August 17, 1922, Serial No. 582,440. Renewed March 11, 1924.

*To all whom it may concern:*

Be it known that I, WILLIAM WESTBURY, a citizen of the United States, residing at Independence, in the county of Montgomery and State of Kansas, have invented new and useful Improvements in Reversible Pots, of which the following is a specification.

This invention relates to reversible glass drawing pots, such as are used in the drawing of glass cylinders, and has particular reference to the construction of a pair of opposed pot members and means for holding the same assembled and in working relation and for pivotally mounting said pot members as a unit in their bearing supports.

The main object of the invention is to provide simple, reliable and effective means for holding the pot members assembled in such manner as to admit of their ready and convenient assemblage and disassemblage, allowing of quick repairs being made or of a new pot being substituted for a deranged or worn-out one, while further reducing weight so that the pot may be more easily handled and more cheaply constructed.

A further object of the invention is to provide a pot clamping and supporting means whereby the pot may be readily, accurately and conveniently centered with relation to the line of draw of the drawing tool.

The invention consists of the features of construction, combination and arrangement of parts, hereinafter fully described and claimed, reference being had to the accompanying drawings, in which:

Figure 1 is a top plan view of a combination pot and kiln structure (the kiln being omitted) embodying a reversible pot constructed in accordance with my invention.

Figure 2 is a view in side elevation of the structure.

Figure 3 is a vertical section through the pot, kiln and a portion of the main frame, showing the kiln lowered to permit reversal of the pot and the pot in the act of being reversed.

Figure 4 is a top plan view of the pot per se.

Figure 5 is a vertical section through the pot taken on the line of its pivotal axis.

Figure 6 is an enlarged detail section taken on a plane such as indicated by line 6—6 of Figure 4.

Figures 7 and 8 are detail sections taken respectively on lines 7—7 and 8—8 of Figure 1.

Referring to the drawings, 1 designates a supporting frame including a top frame ring 2 of square or other suitable form. Arranged upon two of the sides of the frame ring are brackets 3 each carrying spaced bearings 4 in which are journaled trunnions or shaft sections 5 pivotally supporting the reversible pot 6. The brackets 3 are also provided beyond the bearings with lugs 7 having threaded openings for the passage of adjusting screws 8. Each of these screws has a headed outer end for the application of a wrench or other suitable tool whereby the screw may be adjusted, and each screw terminates at its inner end in a conical portion engaging a seat recess 9 in the outer end of the adjacent trunnions 5. These screws may be adjusted to slide the respective trunnions or shaft sections inwardly and outwardly for the purpose of holding the pot carrying elements in engagement with the pot sections, as hereinafter described, and also for the purpose of properly centering the pot with relation to the line of draw of the bait or drawing-tool. To one of the trunnions or shaft sections 5 is connected an operating lever 10 movable in opposite directions to tilt the pot for reversing actions, said shaft being limited in its opposite motions by stops 11 carried by the frame, which serve to support the pot in its reversed positions and to maintain the same in correct horizontal operative position for a drawing action. Preferably the lever 10 is provided with an adjustable counterweight 12 to substantially counter-balance the weight of the pot, thereby enabling the pot to be tilted with a minimum degree of effort on the part of the operator.

The pot 6 comprises two pot members 13 and 14, each having a glass receiving cavity 15 therein, the cavities of the pots being disposed to face in opposite directions and the bottom walls of said pots being disposed in apposition to each other. Each pot is made of fire-clay of some other suitable refractory material and has its outer wall provided with an outwardly extending bead 16 arranged in line with its bottom and forming an annular abutment shoulder 17 extending entirely around the pot.

The trunnions 5 are preferably formed as integral parts of supporting members 18, each consisting of a block or segment of a form to embrace the adjacent side of the pot and to abut at its inner surface against the outer faces of the beads 16 of the two pots, the top and bottom faces of the blocks 18 being arranged to lie substantially flush with the shoulder 17 formed by the beads. As shown particularly in Figures 5 and 6, the supporting blocks 18 are provided at their inner surfaces with flanges 19 which are co-extensive in length and width and project a determined distance between the opposed surfaces of the pot bottoms, said flanges serving as fixed clamping members. Disposed upon the top and bottom faces of each block 18 are clamping plates 21, each conforming in shape thereto, said plates having their inner longitudinal edges arranged to lap over upon the abutment surfaces 17 of the beads 16 and to clamp said beads firmly and securely between the same and the flanges or fixed clamping members 19. Each clamping plate 21 is provided adjacent to its ends with transverse slots 22 receiving headed clamping screws 23 which enter threaded openings in the blocks. These screws are adapted to be tightened when the clamping plates are disposed in operative position to hold the parts in clamping relation, but by slackening the screws the plates 21 may be loosened or relaxed from clamping engagement, thus allowing the supporting block 18 and its clamping flange 19 to be withdrawn from engagement with the pots, such mode of construction adapting the pots to be readily assembled or disassembled. It will be observed that the clamping plates 21 are adapted to be moved outwardly, to an extent limited by the slots 22, sufficiently to enable them to be adjusted to pot releasing position without disconnection from the supporting blocks. By this means when either pot member is damaged or injured, said pot member may be removed independently of the other pot member by simply bringing it to a non-tilted position and moving the upper clamping plates alone to released position, thus adapting the damaged pot to be removed and a new pot substituted therefor without disturbing the other pot of the assembly. It will also be apparent that the construction described adapts both pot sections to be readily and conveniently removed and new pot sections substituted therefor without the necessity of removing the trunnions or shaft sections 5 from their bearings, and therefore without totally dismantling the pot supports, enabling pot changes to be made with great ease and convenience and with a material saving of time and labor in this connection. The screws 8 permit adjustment of the supporting blocks 18 in and out to different degrees to compensate for any slight variations in the diameters of pots or other variations due to warping or other causes. The advantages of my improved reversible pot construction will therefore be readily understood and appreciated from the foregoing description.

I have shown the pot applied for use, as stated, in connection with a vertical kiln 24 slidable in guides 25 on the frame toward and from the mouth of the inverted pot section, this combination being disclosed and claimed in my aforesaid copending application Serial No. 582,439, filed Aug. 17, 1922; but it is to be understood that the pot may be employed with any other type of kiln structure. The kiln 24 is pivotally connected by links 26 with one arm of a raising and lowering lever 27 pivotally mounted at 28 on the frame. The other arm of this lever carries a counter-weight 29 which substantially balances the weight of the kiln, and said counter-weighted arm is pivotally connected by a link 30 to an actuating lever 31 having a locking device 32 to engage the teeth of a segmental rack 33 whereby the kiln may be raised and lowered and locked in adjusted position. Burners 34 are provided with tapered nozzles projecting into the pot through openings 35 in the sides thereof and pivotally engaging said openings, said burners being swiveled, as at 36, to connections leading from gas supply pipes 37 whereby the burners are adapted to swing as the kiln is raised and lowered while being constantly supplied with fuel from the supply pipes.

Having thus fully described my invention, I claim:—

1. In a reversible pot, the combination of a pot structure comprising two pot members having their bottom walls arranged in apposition, segmental supporting blocks at diametrically opposite sides of said pot structure, said blocks having flanges extending inwardly therefrom and between the bottom walls of the pots, trunnions carried by said supporting blocks, and clamping members carried by the blocks and holding the pot bottoms clamped against said flanges.

2. In a reversible pot, the combination of a pot structure comprising two pot members having their bottom walls arranged in apposition, segmental supporting blocks at diametrically opposite sides of said pot structure, said blocks having flanges extending inwardly therefrom and between the bottom walls of the pots, trunnions carried by said supporting blocks, inwardly and outwardly adjusted slotted clamping plates cooperating with the flanges for clamping the pots to the blocks, and screws passing through the slots in said plates and entering said blocks.

3. In a reversible pot, the combination of a pot structure comprising two pot members having their bottom walls arranged in apposition and provided with outwardly extending annular beads forming annular abutment shoulders, segmental supporting blocks bearing against said beads at diametrically opposite sides of said pot structure, said blocks having flanges extending inwardly therefrom and between the bottom walls of the pots, trunnions carried by said supporting blocks, clamping plates upon the blocks engaging said annular shoulders and cooperating with the flanges to clamp the pot members to the blocks, and means for securing said clamping plates to the blocks.

4. In a reversible pot, the combination of a pot structure comprising two pot members having their bottom walls arranged in apposition, segmental supporting members at opposite sides of the pot structure having trunnions extending outwardly therefrom and having flanges extending inwardly therefrom and between the pot bottoms, and means for clamping the pot sections to said blocks.

5. In a reversible pot, the combination of a supporting frame having bearings, a pot structure comprising two pot members having their bottom walls arranged in apposition, segmental supporting blocks at opposite sides of said pot structure, said blocks having outwardly extending trunnions journaled in said bearings and having inwardly extending flanges projecting between the bottom walls of the pots, clamping members carried by the blocks and cooperating with the flanges for clamping the pot bottoms thereto, and adjusting screws on the frame engaging the ends of the trunnions.

In testimony whereof I affix my signature.

WILLIAM WESTBURY.